United States Patent [19]

Ziegler

[11] Patent Number: 5,568,793
[45] Date of Patent: Oct. 29, 1996

[54] STEAM GENERATOR

[75] Inventor: Georg Ziegler, Winterthur, Switzerland

[73] Assignee: ABB Management AG, Baden, Switzerland

[21] Appl. No.: 370,785

[22] Filed: Jan. 10, 1995

[30] Foreign Application Priority Data

Jan. 14, 1994 [CH] Switzerland ............................ 120/94

[51] Int. Cl.$^6$ .................................................. F22G 3/00
[52] U.S. Cl. ............... 122/460; 122/235.11; 122/235.33; 122/476; 122/477
[58] Field of Search ............... 122/235.11, 235.14, 122/235.15, 235.33, 451 R, 460, 476, 477

[56] References Cited

U.S. PATENT DOCUMENTS

| 3,097,631 | 7/1963 | Martin | 122/235.33 |
| 3,120,839 | 2/1964 | Glahe. | |
| 4,241,701 | 12/1980 | Morse | 122/460 |
| 5,020,479 | 6/1991 | Suesada et al. | 122/235.11 |

FOREIGN PATENT DOCUMENTS 1-167501 7/1989 Japan.

Primary Examiner—Henry A. Bennett
Assistant Examiner—Siddharth Ohri
Attorney, Agent, or Firm—Burns, Doane, Swecker & Mathis

[57] ABSTRACT

In a steam generator having a convective part arranged downstream of the furnace chamber and essentially consisting of final superheater (1), pre-superheater, evaporator and economizer connected in series on the flue-gas side, a further contact heat exchanger (5) having a plurality of tube banks (10) is arranged upstream of the final superheater (1). This contact heat exchanger (5) is connected to the steam drum (6) in such a way that it can be operated as both an evaporator and a superheater. The working medium to be heated flows in parallel from the bottom to the top through the tube banks (10), as a rule arranged vertically or inclined, of the contact heat exchanger in the evaporator circuit and flows in series through said tube banks (10) of the heat exchanger in the superheater circuit.

7 Claims, 2 Drawing Sheets

STEAM GENERATOR

BACKGROUND OF THE INVENTION

1. Field of the Invention

The invention relates to a steam generator having a convective part arranged downstream of the furnace chamber and essentially consisting of final superheater, pre-superheater, evaporator and economizer connected in series on the flue-gas side, a further contact heat exchanger having a plurality of tube banks being arranged upstream of the final superheater.

2. Discussion of Background

Steam generators of this type are known, for example from the article "Empfehlungen zum Bau optimaler Eckrohr-Müllkessel", published in the journal "Brennstoff, Wärme, Kraft", volume 38 (March 1986). In order to keep the contamination on account of high tube-wall temperatures within limits and restrict the corrosion problem at high superheated-steam temperatures, the flue-gas temperature upstream of the superheater is not to substantially exceed approximately 650° C. Therefore an evaporator is provided as contact heat exchanger as first contact surface downstream of the radiation-pass outlet. Here, the evaporator arranged upstream of the superheater should have an open transverse spacing and contain so many tube rows that the flue-gas temperature does not exceed the said approximately 650° C. upstream of the superheater.

The critical part in the design of the convective part of a steam boiler, for example for refuse incineration, consists in the correct dimensioning of these heating surfaces, that is of the contact heat exchanger, acted upon first by the flue gas. This so-called "protective nest" is as a rule designed for the contaminated operation at high flue-gas temperatures in such a way-that the aforesaid 650° C., which the operator of the installation is guaranteed, upstream of the superheater is not exceeded. The superheater in turn is as a rule designed for clean operation at guaranteed minimum load, i.e. a predetermined partial load. This is an operating point at which relatively cold flue-gas temperatures prevail at the radiation-pass outlet as a result of the temperature gradient in the radiation space. However, since the relatively amply proportioned heating surfaces of the contact heat exchanger are still arranged upstream of the superheater, the already relatively cool gases are additionally cooled down there. Therefore the superheater has to be of large and complicated construction in order to actually reach the guaranteed superheater temperature. In contaminated operation, on the other hand, i.e. when the flue gases at the radiation-pass outlet are substantially hotter, the superheater of correspondingly large size receives too much heat. A remedy is provided here by virtue of the fact that, at the superheater, which as a rule is a two-part superheater, a large quantity of water is injected between the pre-superheater and the final superheater. This can lead to a second costly injection possibly having to be provided. Or else the so-called running time, i.e. the interval between two boiler inspections, must be reduced for the purpose of cleaning the exchange tubes.

SUMMARY OF THE INVENTION

Accordingly, one object of the invention, in the case of a steam generator of the type mentioned at the beginning, is to avoid the above-mentioned disadvantages and provide a means with which- an additional water injection can be dispensed with while the running time remains constant.

According to the invention, this is achieved when the contact heat exchanger is connected to the steam drum in such a way that it can be operated as both an evaporator and a superheater, the working medium to be heated flowing in parallel from the bottom to the top through the tube banks, as a rule arranged vertically or inclined, of the contact heat exchanger in the evaporator circuit and flowing in series through said tube banks of the heat exchanger in the superheater circuit.

The advantage of the novel measure can be seen in its particular simplicity, which also permits problem-free retrofitting of existing installations. Furthermore, it is possible to run at partial load over wide ranges even during clean operation.

To change over from evaporator to superheater operation and vice versa, it is convenient when the inlet-side and outlet-side collectors of the tube banks are connected to the steam drum via an overflow pipe which can be shut off as well as via a steam barrier to the steam line leading from the steam drum to the pre-superheater. It is especially simple when a siphon provided with drain valves is used in each case as steam barrier.

During the superheater operation, a shut-off member in the steam line leading from the steam drum to the pre-superheater is closed, this shut-off member being arranged between the lines branching off to the steam barriers. These steam barriers with the corresponding lines to the steam line as well as the shut-off member, arranged between these lines, in the steam line are in principle the only elements which have to be added to an existing installation intended for evaporator operation with regard to an additional superheater operation.

During the evaporator operation, the bottom collectors of the vertically arranged tube banks-are connected to the down pipe of the steam drum via a line which can be shut off in order to guarantee natural circulation.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Only the elements essential for understanding the invention are shown. The upstream radiation space, for example, is not shown in FIG. 1 and the pipe connections to the pre-superheater and to the evaporator as well as the feed and discharge lines of the final superheater are not shown in FIGS. 2 and 3. The directions of flow of the working media are designated by arrows.

DESCRIPTION OF THE PREFERRED EMBODIMENTS

Figure 1:
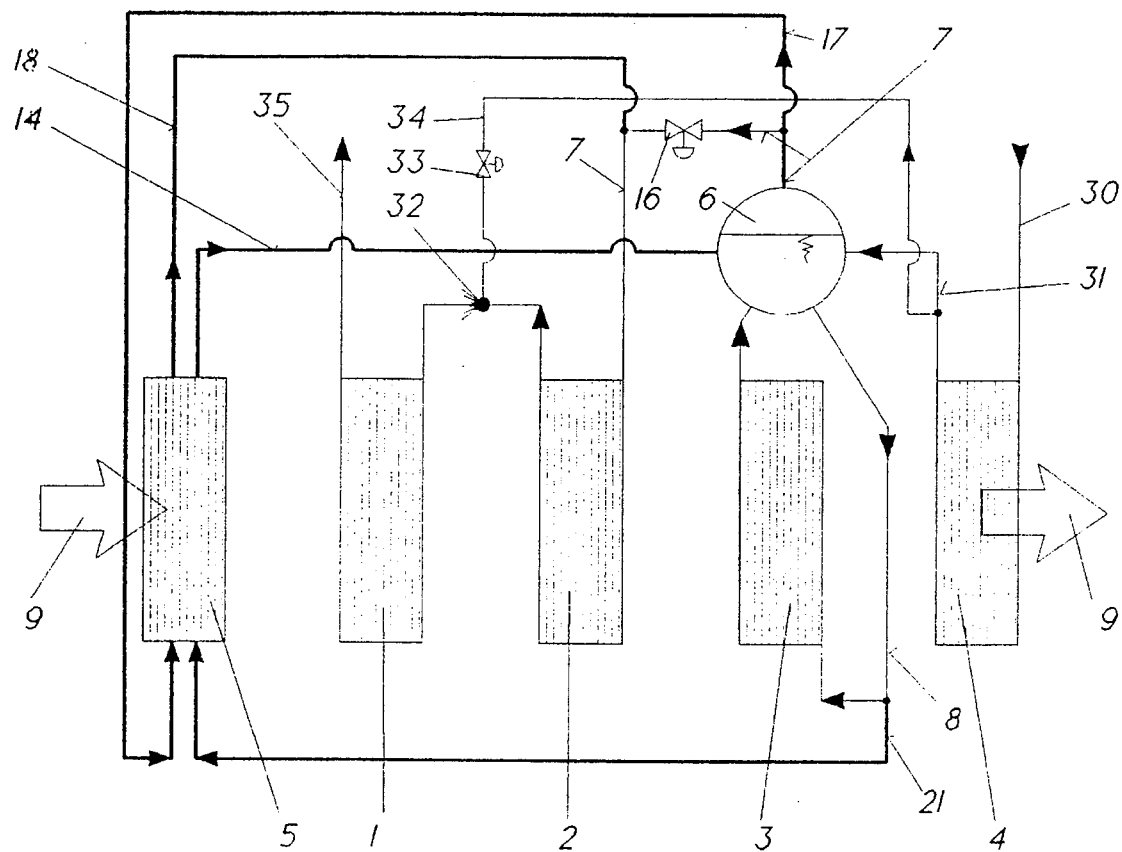
FIG. 1 shows the diagrammatic sketch of the convective part of a steam generator.

Referring now to the drawings, wherein like reference numerals designate identical or corresponding parts throughout the several views, in FIG. 1 the circuit diagram shows the horizontally arranged contact pass of a steam boiler suitable for refuse incineration. The apparatuses acted upon by the flue gases in arrow direction 9 are, in the sequence of their through-flow, first of all a contact heat exchanger 5, a final superheater 1, a pre-superheater 2, an evaporator 3 and finally an economizer 4.

The working medium to be heated, here boiler water, passes via an inlet line 30 into the economizer 4. Its outlet line 31 leads into the steam drum 6. From its down pipe 8, the water is fed in natural circulation into an evaporator 3, from which it is directed back into the water part of the steam drum. From the steam part of the drum, the working medium passes via the steam line 7 into the pre-superheater 2 of the two-part superheater. A water injector 32 is arranged in the connecting line between the pre-superheater 2 and the final superheater 1. The water to be injected there into the steam line 7 is drawn via an injection line 34 which is equipped with a shut-off member 33 and branches off from the outlet line 31 of the economizer 4. From the final superheater 3, the superheated steam is fed via a live-steam line 35 to the consumer, as a rule a steam turbine.

Branching off from the down pipe 8 of the steam drum 6 is a line 21 which leads into the contact heat exchanger 5. Its outlet is in turn connected on the water side to the steam drum 6 via an overflow pipe 14. Thus far installations in which the contact heat exchanger 5 can work only as evaporator are known.

The novel measure henceforth consists in also using the contact heat exchanger 5 in superheater operation. To this end, two further lines branch off from the steam line 7. A first line 17 leads to the contact heat exchanger 5, and a second line 18 leads from this apparatus back to the inlet of the pre-superheater 2. So that the working medium can flow through this loop, a shut-off member 16 is provided in the steam line 7 between the two branches.

Figure 3:
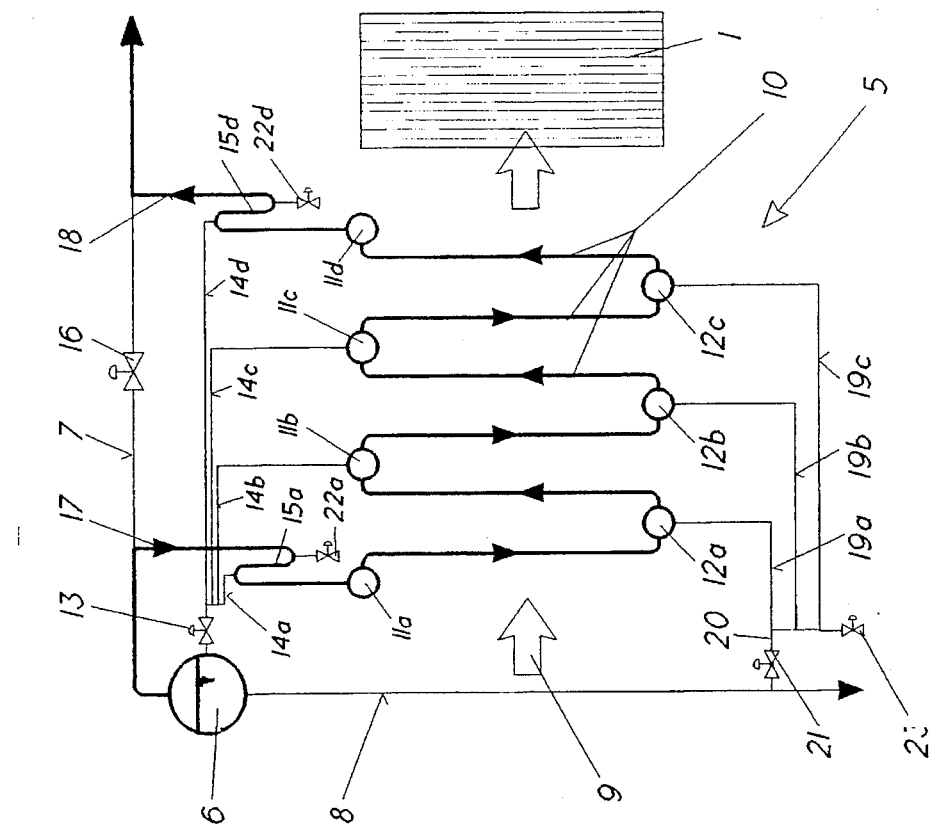
FIG. 3 shows the contact heat exchanger superheater circuit.
Figure 2:
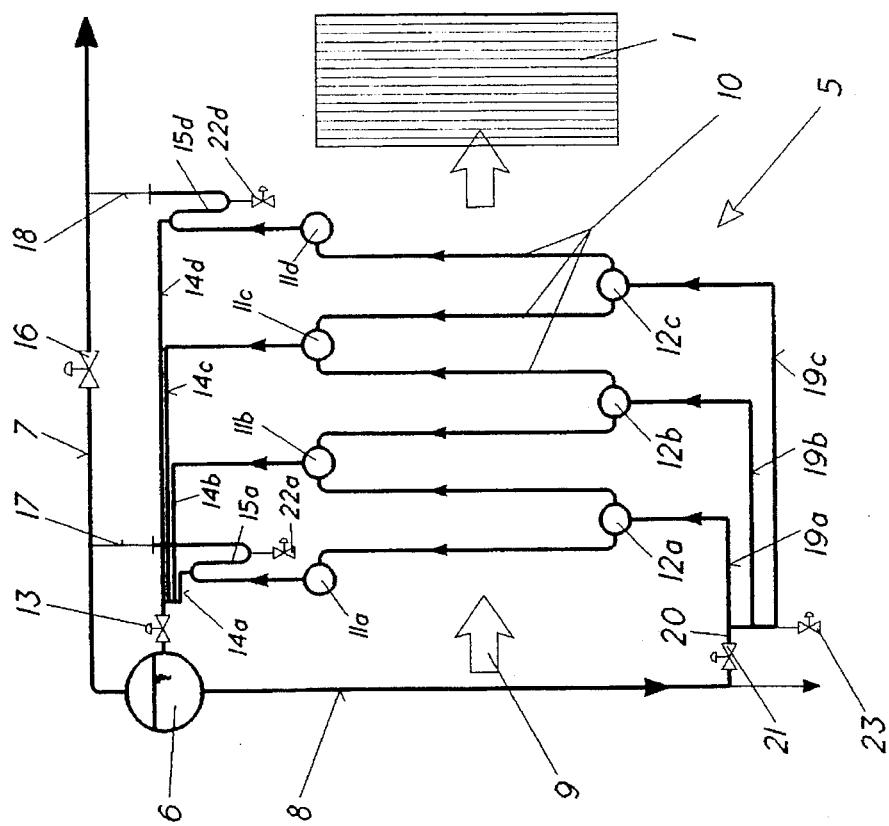
FIG. 2 shows the contact heat exchanger in evaporator circuit.

How the novel measure appears in detail is explained in FIGS. 2 and 3, which essentially show only the contact heat exchanger 5 together with feed and discharge lines. These two figures differ merely in the thickness of the linework of individual elements and in the arrow direction of the medium to be heated. The lines shown by thick solid linework designate the lines in operation in each case. Here, FIG. 2 shows the evaporator operation and FIG. 3 the superheater operation.

The contact heat exchanger essentially consists of a plurality of tube banks 10 which are connected in series and of which only three are shown here. The vertically running tubes (not designated in more detail) of the individual banks are welded at their top ends in collectors 11a, 11b, 11c and 11d. They are welded at their bottom ends in collectors 12a, 12b and 12c.

The bottom collectors are connected via feed lines 19a, 19b and 19c to a common line 20, which in turn branches off from the down pipe 8. A shut-off member 21 as well as a drain valve 23 are arranged in the line 20.

The top collectors are each connected via overflow pipes 14a, 14b, 14c and 14d to a common line which leads into the water part of the steam drum 6. A shut-off member 13 is arranged in this line. All overflow pipes run below the water level of the steam drum 6.

The inlet-side collector 11a of the contact heat exchanger and its outlet-side collector 11d are only connected indirectly to their respective overflow pipes 14a and 14d. Connected in between are steam barriers 15a and 15d in the form of simple siphons. The overflow pipes 14a and 14d each branch off from the top bends of the siphons. A drainage means in the form of drain valves 22a and 22d respectively is in each case provided at the bottom bends of the siphons. The other end of the siphons 15a and 15d is conductively connected to the steam line 7 via lines 17 and 18 respectively. These lines 17 and 18 respectively are the above-mentioned branches between which the shut-off member 16 is located in the steam line.

The mode of operation of the installation is as follows:

In the evaporator circuit of the contact heat exchanger 5 according to FIG. 2, the water to be evaporated passes from the down pipe 8, when shut-off member 21 is open, via the feed lines 19a, 19b and 19c into the bottom collectors 12a, 12b and 12c of the tube banks 10. The water flows through all tubes of the plurality of banks in the rising direction. In the process, heat is received from the flue gases 9 flowing around the tubes. The working medium passes into the top collectors 11a to 11d and passes from there either directly (11b, 11c) or, in the case of the inlet and outlet collectors (11a, 11d), via the legs of the siphons into the overflow pipes 14a to 14d. The water/steam mixture is fed via the open shut-off member 13 into the water part of the drum. When shut-off member 16 is open, the steam present in the drum passes via the steam line 7 to the pre-superheater. In the siphon legs connected to the steam line 7 via the lines 17 and 18, the water level is set approximately to the water level of the steam drum 6, as indicated in FIG. 2. The operator will select this evaporator circuit in the case of a contaminated installation, i.e. in the case of relatively hot flue gases, in which case a large quantity of heat is to be drawn off at the apparatus 5 of appropriate size upstream of the final superheater.

The operator will select the superheater circuit of the contact heat exchanger 5 according to FIG. 3 at the start of the running time, i.e. in the case of a clean installation and therefore flue gases which are less hot. To this end, the exchanger 5 has to be emptied. When shut-off members 20 and 13 are closed and drain valves 23, 22a and 22d are open, the water is drained. The shut-off member 16 in the steam line 7 is closed. During operation, the steam coming from the steam drum now flows via the line 17 and the steam barrier 15a into the inlet collector 11a of the tube bank 10 acted upon first by the steam and the flue gases. As shown in FIG. 3, the steam now flows through the individual tube banks in series. The apparatus 5 now acts as pre-superheater. From the outlet collector 11d, the partly superheated steam passes via the steam barrier 15d and the line 18 back into the steam line 7 and from there into the actual pre-superheater.

The mode of operation shown in FIG. 3 can also be selected in the case of a contaminated installation operated at partial load. This is a further advantage over the known installations.

It goes without saying that the invention is not restricted to the exemplary embodiment shown and described. In a deviation from the direct-flow circuit, shown in FIG. 3, of the tube banks, the apparatus could just as well be acted upon in counterflow. In this case, the steam coming from the steam drum 6 would be directed via the line 18 and the steam barrier 15d first of all into the collector 11d and, after flowing through the tube banks, would be drawn off from the collector 11a.

Furthermore, it would be conceivable to provide a sudden change-over from evaporator to superheater operation and vice versa during the boiler operation.

Moreover, unlike the circuit shown, the contact heat exchanger 5 can also be fed with water from the economizer 4. In that case, the lower collectors 12a, 12b, 12c of the vertically arranged bank of tubes would communicate not with the down pipe 8 of the steam drum 6 but rather with the outlet line 31 of the economizer 4, via feed lines 19a, 19b, 19c and a line 21 that can be closed off.

Obviously, numerous modifications and variations of the present invention are possible in light of the above teachings. It is therefore to be understood that within the scope of the appended claims, the invention may be practiced otherwise than as specifically described herein.

What is claimed is:

1. A steam generator, the steam generator generating steam with heat from flue gas from a furnace chamber and being arranged downstream of the furnace chamber, the steam generator comprising:

a final superheater having an inlet and an outlet;

a pre-superheater having an inlet and an outlet;

an evaporator having an inlet and an outlet;

an economizer having an inlet and an outlet;

fluid flow lines including portions between the inlet of the final superheater and the outlet of the pre-superheater, the inlet of the pre-superheater and the outlet of the evaporator, and the inlet of the evaporator and the outlet of the economizer;

the final superheater, the pre-superheater, the evaporator, and the economizer being disposed in a path of flue gas from a furnace chamber;

a steam drum having an inlet connected along the portion of the fluid flow lines from the outlet of the economizer, the steam drum having an outlet for water and an outlet for steam, the fluid flow lines including portions leading from the outlet for water of the steam drum to the inlet of the evaporator and from the outlet for steam of the steam drum to the inlet of the pre-superheater;

a contact heat exchanger disposed in the path of flue gas from the furnace chamber, the contact heat exchanger having a plurality of tube banks and an inlet and an outlet, the contact heat exchanger being arranged in the path of flue gas from the furnace chamber upstream of the final superheater, the fluid flow lines including portions leading from the outlet for water of the steam drum to the inlet of the contact heat exchanger and from the outlet for steam of the steam drum and the inlet of the contact heat exchanger, and from the outlet of the contact heat exchanger to the inlet of the pre-superheater and from the outlet of the contact heat exchanger to the steam drum; and shut off valves disposed in the fluid flow lines to alternately permit fluid flow from the water outlet of the steam drum to the contact heat exchanger and from the steam outlet of the steam drum to the contact heat exchanger to alternately operate the contact heat exchanger as an evaporator and a superheater.

2. The steam generator as claimed in claim 1, wherein the tube banks of the contact heat exchanger are arranged between the inlet at a bottom and the outlet at a top of the contact heat exchanger, the tube banks being vertical or inclined, fluid flowing through the tube banks of the contact heat exchanger in parallel from a bottom to a top of the contact heat exchanger through the tube banks when the contact heat exchanger operates as an evaporator and flowing in series through the tube banks when the contact heat exchanger operates as pre-superheater, the tube banks having inlet-side and outlet-side collectors connected to the steam drum via an overflow pipe having a shut off valve therein and via a steam barrier to the fluid flow line from the steam drum to the pre-superheater.

3. The steam generator as claimed in claim 2, wherein the steam barrier is a siphon.

4. The steam generator as claimed in claim 2, wherein, in the portion of the fluid flow lines from the steam drum to the pre-superheater, a shut-off member is arranged between lines branching off to the steam barriers.

5. The steam generator as claimed in claim 1, wherein the tube banks of the contact heat exchanger are arranged between the inlet at a bottom and the outlet at a top of the contact heat exchanger, the tube banks being vertical or inclined, fluid flowing through the tube banks of the contact heat exchanger in parallel from a bottom to a top of the contact heat exchanger through the tube banks when the contact heat exchanger operates as an evaporator and flowing in series through the tube banks when the contact heat exchanger operates as pre-superheater, the tube banks including bottom collectors connected to a down pipe portion of the fluid flow lines from the water outlet of the steam drum via feed lines and a line which can be shut off.

6. The steam generator as claimed in claim 1, wherein the tube banks of the contact heat exchanger are arranged between the inlet at a bottom and the outlet at a top of the contact heat exchanger, the tube banks being vertical or inclined, fluid flowing through the tube banks of the contact heat exchanger in parallel from a bottom to a top of the contact heat exchanger through the tube banks when the contact heat exchanger operates as an evaporator and flowing in series through the tube banks when the contact heat exchanger operates as pre-superheater, the tube banks including bottom collectors that communicate with portion of the fluid flow lines from the outlet of the economizer via feed lines and a line that can be closed off.

7. The steam generator as claimed in claim 2, further comprising feed lines from the inlet of the contact heat exchanger to the inlet-side collectors, and evacuation valves in the overflow pipe, the steam barrier, and feed lines.

\* \* \* \* \*